(12) United States Patent
Zhou

(10) Patent No.: US 8,749,724 B2
(45) Date of Patent: Jun. 10, 2014

(54) LCD PANEL

(75) Inventor: Xiu-feng Zhou, Shenzhen (CN)

(73) Assignee: Shenzhen China Star Optoelectronics Technology Co., Ltd., Guangdong (CN)

( * ) Notice: Subject to any disclaimer, the term of this patent is extended or adjusted under 35 U.S.C. 154(b) by 129 days.

(21) Appl. No.: 13/378,040

(22) PCT Filed: Aug. 21, 2011

(86) PCT No.: PCT/CN2011/078679
§ 371 (c)(1),
(2), (4) Date: Dec. 13, 2011

(87) PCT Pub. No.: WO2013/013431
PCT Pub. Date: Jan. 31, 2013

(65) Prior Publication Data
US 2013/0044281 A1 Feb. 21, 2013

(30) Foreign Application Priority Data

Jul. 27, 2011 (CN) .......................... 2011 2 0268598

(51) Int. Cl.
*G02F 1/1368* (2006.01)
(52) U.S. Cl.
USPC .................. 349/37; 349/42; 349/143; 345/92

(58) Field of Classification Search
USPC ...................... 349/37, 42, 43, 143; 345/92, 96
See application file for complete search history.

(56) References Cited

U.S. PATENT DOCUMENTS

| | | | | |
|---|---|---|---|---|
| 2004/0246404 A1* | 12/2004 | Elliott et al. | ..................... | 349/88 |
| 2008/0266232 A1* | 10/2008 | Hsu | ................................ | 345/96 |
| 2009/0096943 A1* | 4/2009 | Uehara et al. | ................... | 349/37 |
| 2009/0109357 A1* | 4/2009 | Liu et al. | ......................... | 349/37 |
| 2012/0105494 A1* | 5/2012 | Lee et al. | ....................... | 345/690 |

* cited by examiner

*Primary Examiner* — Dung Nguyen
*Assistant Examiner* — Tai Duong

(57) ABSTRACT

The present invention discloses an LCD panel. The LCD panel includes a plurality of data lines, a plurality of scan lines insulatingly intersecting the data lines, and a plurality of pixel units defined by the scan lines and corresponding data lines. Any two adjacent pixel units in a same row are respectively coupled to two corresponding scan lines. Any two adjacent pixel units in a same column are respectively coupled to two corresponding data lines. In this present invention, the pixel units coupled to a same data line are respectively coupled to different scan lines so as to reduce the power consumption of the LCD panel.

12 Claims, 4 Drawing Sheets

LCD PANEL

FIELD OF THE INVENTION

The present invention relates to the field of liquid crystal display (LCD), and especially to an LCD panel.

BACKGROUND OF THE INVENTION

With a growing popularity of LCDs, LCDs are demanded for better functions.

Referring to FIG. 1, FIG. 1 is a schematic drawing illustrating pixel structures of an LCD panel in the prior art. The LCD panel includes m data lines D"1~D"m and n scan lines G"1~G"n. The data lines intersect the scan lines, and two adjacent data lines intersect two adjacent scan lines to define a pixel unit (not labeled). A thin film transistor (TFT) and a liquid crystal capacitor (not shown) are disposed on each pixel unit.

Data signals that are transmitted on the data lines D"1~D"m can be divided into data signals of positive polarity and data signals of negative polarity reference to a common voltage Vcom which is 0 v. The data signals of positive polarity means that the voltages of data signals are higher than the common voltage Vcom, and the data signals of negative polarity means that the voltages of data signals are lower than the common voltage Vcom. When a data signal of positive polarity and a data signal of negative polarity both have the same gray scale value, theoretically, they have the same display effects.

Liquid crystal molecules have followed common character: when both sides of a liquid crystal layer are applied to electric field and if the direction of the electric field is kept constant for a long time, the characteristics of the liquid crystal molecules are destroyed. That is, the liquid crystal molecules fail to rotate in response to changes of the electric field for forming various gray scales. Therefore, the direction of the electric field has to change every a period of time for reversing the liquid crystal molecules so as to prevent the characteristics of the liquid crystal molecules from being destroyed. There are a variety of driving methods to realize the reversal of the liquid crystal molecules in the LCD field, such as dot inversion, 1+2 dot inversion, column inversion, and row inversion.

When the driving method of the 1+2 dot inversion is employed in the above-mentioned LCD panel, in the case of the pixel units in each row, the direction of the electric field of the liquid crystal capacitance in (4k−3)th and (4k)th columns of the pixel units is opposite to the direction of the electric field of the liquid crystal capacitance in (4k−2)th and (4k−1)th columns of the pixel units. Thus, the polarity of the gray scale voltages of the data lines D"4k−3 and D"4k is opposite to the polarity of the gray scale voltages of the data lines D"4k−2 and D"4k−1, where K is an arbitrary natural number. In addition, the direction of the electric field of the liquid crystal capacitance in odd rows of the pixel units and even rows of the pixel units are opposite. Thus, the voltages of the data lines D"4k−3 and D"4k as well as the data lines D"4k−2 and D"4k−1 have to continuously switch their polarity in a frame time T as shown in FIG. 2. However, the frequent polarity switching must increase power consumption of the LCD panel, resulting in waste of resources.

SUMMARY OF THE INVENTION

An objective of the present invention is to provide an LCD panel to overcome the drawback that the frequent polarity switching on the data lines must increase the power consumption of the LCD panel driven by using the 1+2 dot inversion in the prior art and the waste of the resources.

To achieve the foregoing objective, An LCD panel comprises: a plurality of data lines, a plurality of scan lines insulatingly intersecting the data lines, and a plurality of pixel units defined by the scan lines and corresponding data lines. Five adjacent data lines sequentially arranged intersect three adjacent scan lines sequentially arranged to define eight pixel units designated as a pixel unit set. The five adjacent data lines comprise a first data line, a second data line, a third data line, a fourth data line, and a fifth data line and the three adjacent scan lines comprise a first scan line, a second scan line, and a third scan line. The pixel unit set comprise four adjacent pixel units composed of a first pixel unit, a second pixel unit, a third pixel unit, and a fourth pixel unit sequentially disposed in one row and other four adjacent pixel units composed of a fifth pixel unit, a sixth pixel unit, a seventh pixel unit, and an eighth pixel unit sequentially disposed in another adjacent other row. In four adjacent pixel units in one row, the first pixel unit and the fourth pixel unit are respectively coupled to the first data line and the fifth data line, and the second pixel unit and the third pixel unit are respectively coupled to the second data line and the fourth data line. In the other four adjacent pixel units in another adjacent row, the fifth pixel unit and the eighth pixel unit are respectively coupled to the second data line and the fourth data line, and both the sixth pixel unit and the seventh pixel unit are coupled to the third data line. The pixel units coupled to a same data line are respectively coupled to different scan lines.

Preferably, the first pixel unit and the third pixel unit are coupled to the first scan line, and the second pixel unit, the fourth pixel unit, the sixth pixel unit, and the eighth pixel unit are all coupled to the second scan line, and both the fifth pixel unit and the seventh pixel unit are coupled to the third scan line.

Preferably, each pixel unit comprises a thin film transistor, and the thin film transistor includes a source electrode and a gate electrode. The source electrodes of the thin film transistors of the first pixel unit and the fourth pixel unit are respectively coupled to the first data line and the fifth data line. The source electrodes of the thin film transistors of the second pixel unit and the third pixel unit are respectively coupled to the second data line and the fourth data line. The source electrodes of the thin film transistors of the fifth pixel unit and the eighth pixel unit are respectively coupled to the second data line and the fourth data line, and both the source electrodes of the thin film transistors of the sixth pixel unit and the seventh pixel unit are coupled to the third data line.

An LCD panel comprises: a plurality of data lines, a plurality of scan lines insulatingly intersecting the data lines, and a plurality of pixel units defined by the scan lines and corresponding data lines. Five adjacent data lines sequentially arranged intersect three adjacent scan lines sequentially arranged to define eight pixel units designated as a pixel unit set. The five adjacent data lines comprise a first data line, a second data line, a third data line, a fourth data line, and a fifth data line and the three adjacent scan lines comprise a first scan line, a second scan line, and a third scan line. The pixel unit set comprise four adjacent pixel units composed of a ninth pixel unit, a tenth pixel unit, an eleventh pixel unit, and a twelfth pixel unit sequentially disposed in one row and other four adjacent pixel units composed of a thirteenth pixel unit, a fourteenth pixel unit, a fifteenth pixel unit, and a sixteenth pixel sequentially disposed in another adjacent row. In the four adjacent pixel units in one row, the ninth pixel unit and the twelfth pixel unit are respectively coupled to the second data line and the fourth data line, and both the tenth pixel unit and the eleventh pixel unit are coupled to the third data line. In the other four adjacent pixel units in another adjacent row, the thirteenth pixel unit and the sixteenth pixel unit are respectively coupled to the first data line and the fifth data line, and the fourteenth pixel unit and the fifteenth pixel unit are respectively coupled to the second data line and the fourth data line. The pixel units coupled to a same data line are respectively coupled to different scan lines.

Preferably, in the four adjacent pixel units in one row, both the ninth pixel unit and the eleventh pixel unit are coupled to the second scan line, and both the tenth pixel unit and the twelfth pixel unit are coupled to the first scan line. In the other four adjacent pixel units in another adjacent row, both the thirteenth pixel unit and the fifteenth pixel unit are coupled to the second scan line, and both the fourteenth pixel unit and the sixteenth pixel unit are coupled to the third scan line.

Preferably, each pixel unit comprises a thin film transistor, the thin film transistor includes a source electrode and a gate electrode. The source electrodes of the thin film transistors of the ninth pixel unit and the twelfth pixel unit are respectively coupled to the second data line and the fourth data line, the source electrodes of the thin film transistors of both the tenth pixel unit and the eleventh pixel unit are coupled to the third data line. The source electrodes of the thin film transistors of the thirteenth pixel unit and the sixteenth pixel unit are respectively coupled to the first data line and the fifth data line, and the source electrodes of the thin film transistors of the fourteenth pixel unit and the fifteenth pixel unit are respectively coupled to the second data line and the fourth data line.

An LCD panel, comprises: a plurality of data lines, a plurality of scan lines insulatingly intersecting the data lines, and a plurality of pixel units defined by the scan lines and corresponding data lines. Any two adjacent pixel units in a same row are respectively coupled to two corresponding scan lines. Any two adjacent pixel units in a same column are respectively coupled to two corresponding data lines.

In comparison with the prior art, the LCD panel of the present invention can realize the 1+2 dot inversion without continuously switching the polarities of the data lines. Thus, the power consumption of the LCD panel is greatly reduced.

It is to be understood that both the foregoing general description and the following detailed description of the present invention are exemplary and explanatory and are intended to provide further explanation of the invention as claimed.

DETAILED DESCRIPTION OF THE PREFERRED EMBODIMENTS

Descriptions of the following embodiments refer to attached drawings which are utilized to exemplify specific embodiments.

Figure 1:
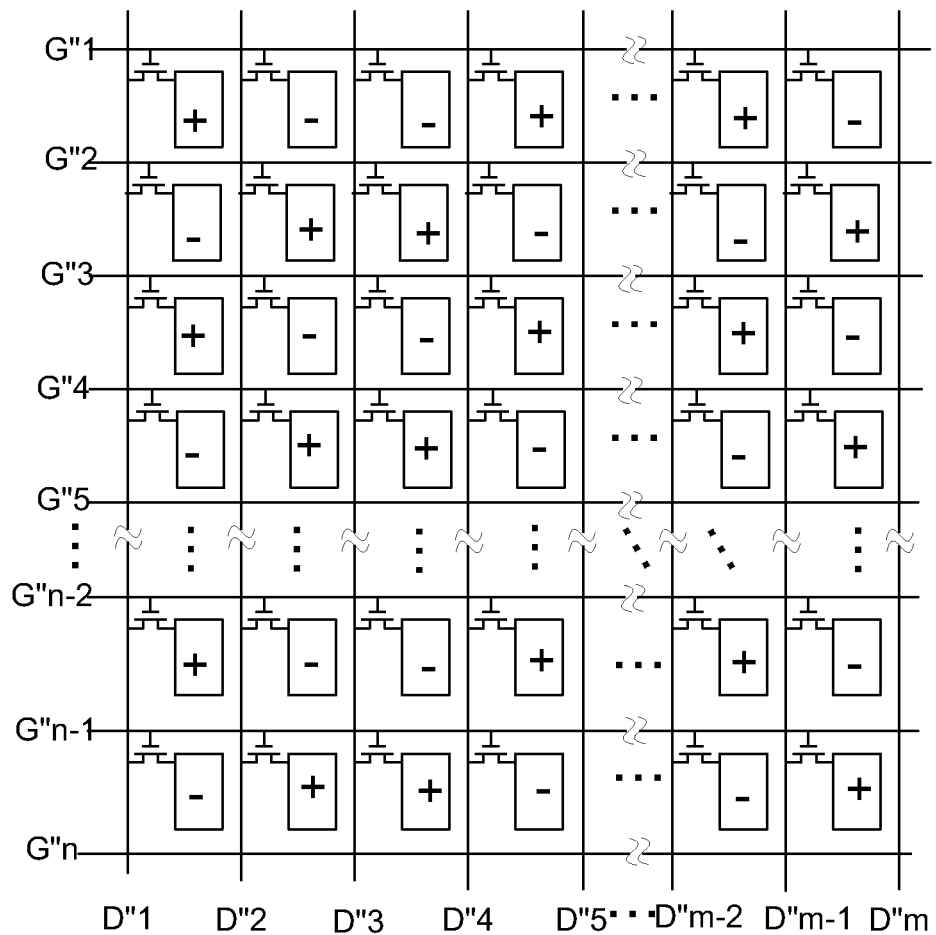
FIG. 1 is a schematic drawing illustrating pixel structures of an LCD panel of the prior art.
Figure 2:
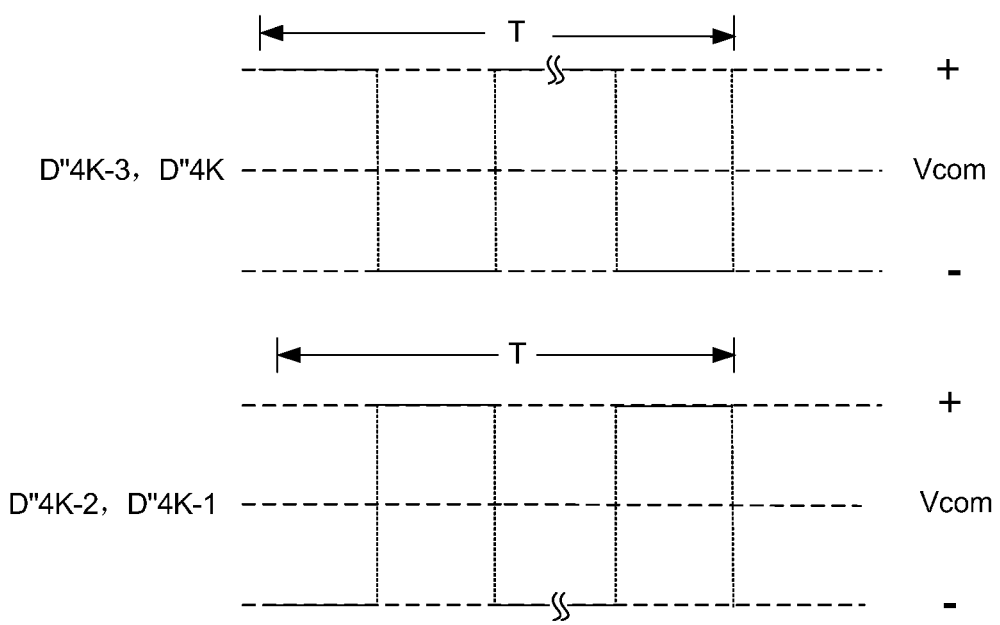
FIG. 2 is a schematic drawing illustrating voltage waveforms of the data lines of the LCD panel driven by using the 1+2 dot inversion of FIG. 1.
Figure 3:
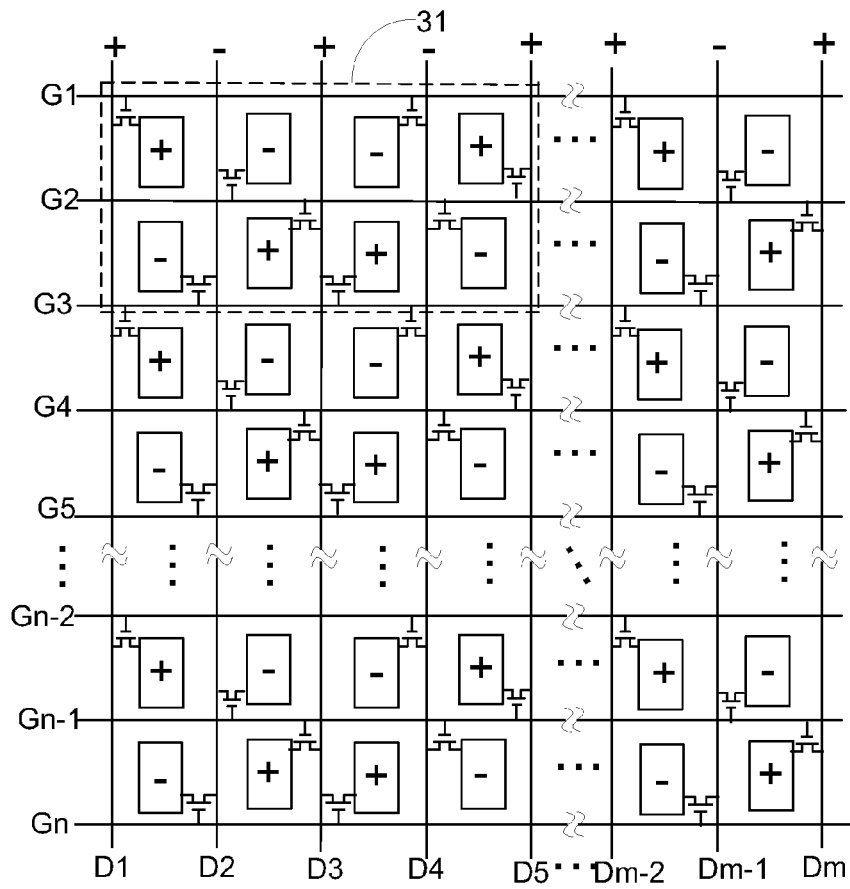
FIG. 3 is a schematic drawing illustrating pixel structures of an LCD panel according to a first preferred embodiment of the present invention.

FIG. 3 is a schematic drawing illustrating pixel structures of an LCD panel according to a first preferred embodiment of the present invention.

Referring to FIG. 3, the LCD panel includes m data lines D1~Dm, and n scan lines G1~Gn, in which m and n are arbitrary natural numbers. The data lines are perpendicular to and intersect the scan lines. It is not hard to see that two adjacent data lines intersect two adjacent scan lines to define a pixel unit (not labeled). Each pixel unit includes a thin film transistor (not labeled) and a liquid crystal capacitor (not shown). The scan lines apply scanning signals to the pixel units. The data lines apply gray scale voltages to the pixel units.

Figure 4:
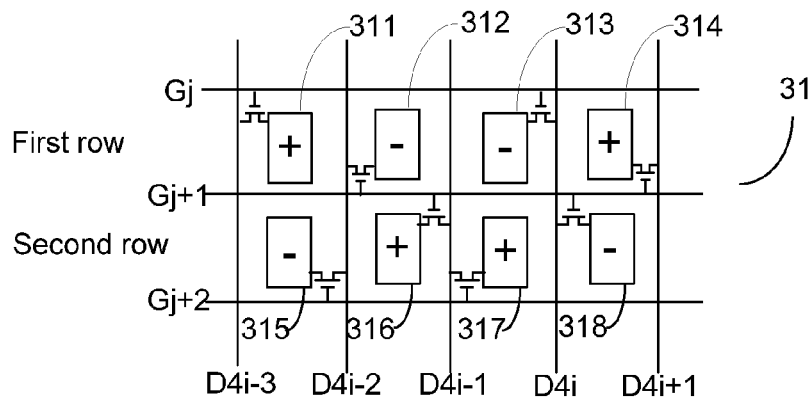
FIG. 4 is a schematic drawing illustrating a pixel unit set of the LCD panel shown in FIG. 3.

FIG. 4 is a schematic drawing illustrating a pixel unit set of the LCD panel shown in FIG. 3. Referring to FIGS. 3 and 4, five adjacent data lines disposed in order intersect three adjacent scan lines disposed in order to define eight pixel units which are designated as a pixel unit set. The five adjacent data lines include a first data line D4i−3, a second data line D4i−2, a third data line D4i−1, a fourth data line D4i, and a fifth data line D4i+1. The three adjacent scan lines include a first scan line Gj, a second scan line Gj+1, and a third scan line Gj+2. The eight pixel units include a first pixel unit 311, a second pixel unit 312, a third pixel unit 313, and a fourth pixel unit 314 sequentially disposed in one row and comprise a fifth pixel unit 315, a sixth pixel unit 316, a seventh pixel unit 317, and an eighth pixel unit 318 sequentially disposed in another row. wherein as well as j are arbitrary natural numbers, and 1≤4i−3<4i+1≤m, 1≤j<j+2≤n. A plurality of the pixel unit sets are sequentially arranged in the row direction which is parallel to the scan lines, and at the same time sequentially arranged in the column direction which is parallel to the data lines.

In the pixel unit set 31, for the four pixel units in the first row, the first pixel unit 311 and the fourth pixel unit 314 are respectively coupled to the first data line D4i−3 and the fifth data line D4i+1. The second pixel unit 312 and the third pixel unit 313 are respectively coupled to the second data line D4i−2 and the fourth data line D4i. For the four pixel units in the second row, the fifth pixel unit 315 and the eighth pixel unit 318 are respectively coupled to the second data line D4i−2 and the fourth data line D4i. Both the sixth pixel unit 316 and the seventh pixel unit 317 are coupled to the third data line D4i−1.

In the pixel unit set 31, any two adjacent pixel units in the first row are respectively provided scanning signals by two corresponding scan lines. Specifically, for the four adjacent pixel units in the first row, gate electrodes of the thin film transistors of the first pixel unit 311 and the third pixel unit 313 are coupled to the first scan line Gj, and gate electrodes of the thin film transistors of the second pixel unit 312 and the fourth pixel unit 314 are coupled to the second scan line Gj+1. For the four pixel units in the second row, gate electrodes of the thin film transistors of the fifth pixel unit 315 and the seventh pixel unit 317 are coupled to the third scan line Gj+2, and gate electrodes of the thin film transistors of the sixth pixel unit 316 and the eighth pixel unit 318 are coupled to the second scan line Gj+1.

Figure 5:
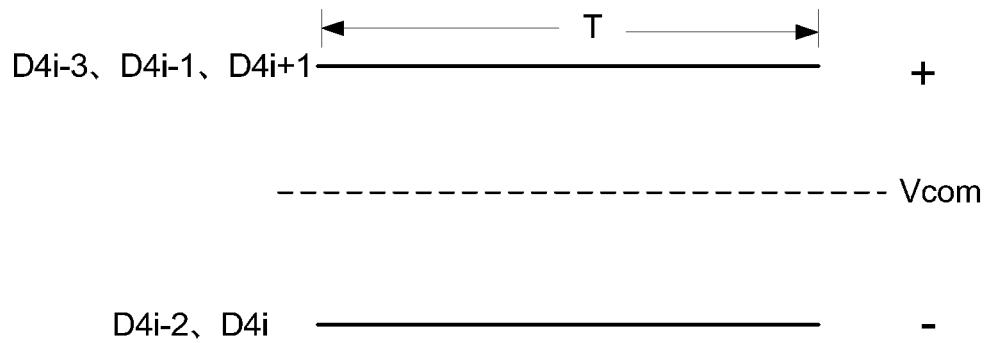
FIG. 5 is a schematic drawing illustrating voltage waveforms of the data lines of the LCD panel driven by using the 1+2 dot inversion of FIG. 3.

Referring to FIG. 5, FIG. 5 is a schematic drawing illustrating voltage waveforms of the data lines of the LCD panel driven by using the 1+2 dot inversion of FIG. 3. The polarity of the gray scale voltage of each data line remains unchanged for a frame period T, and the two adjacent data lines are applied the gray scale voltages of opposite polarities. In the embodiment, the gray scale voltages of data lines in odd columns such as the first data line D4i−3, the third data line D4i−1, and the fifth data line D4i+1 are positive polarity voltages (i.e., the voltages are higher than the common voltage). The gray scale voltages of data lines in even columns such as the second data line D4i−2, the fourth data line D4i are negative polarity voltages (i.e., the voltages are lower than the common voltage).

Referring to FIGS. 4 and 5, a driving method of the pixel unit set 31 of the LCD panel is described as follows.

Firstly, the first scan line Gj applies a scanning signal to turn on the thin film transistors of the first pixel unit 311 and the third pixel unit 313; meanwhile, the first data line D4i−3 applies a gray scale voltage of positive polarity to charge the first pixel unit 311, and the fourth data line D4i applies a gray scale voltage of negative polarity to charge the third pixel unit 313.

Secondly, the second scan line Gj+1 applies a scanning signal to turn on the thin film transistors of the second pixel unit 312, the fourth pixel unit 314, the sixth pixel unit 316 and the eighth pixel unit 318 simultaneously. Meanwhile, the second data line D4i−2 applies a gray scale voltage of negative polarity to charge the second pixel unit 312. The third data line D4i−1 applies a gray scale voltage of positive polarity to charge the sixth pixel unit 316. The fourth data line D4i applies a gray scale voltage of negative polarity to charge the eighth pixel unit 318. The fifth data line D4i+1 applies a gray scale voltage of positive polarity to charge the fourth pixel unit 314.

Finally, the third scan line Gj+2 applies a scanning signal to turn on the thin film transistors of the fifth pixel unit 315 and the seventh pixel unit 317; meanwhile, the second data line D4i−2 applies a gray scale voltage of negative polarity to charge the fifth pixel unit 315, and the third data line D4i−1 applies a gray scale voltage of positive polarity to charge the seventh pixel unit 317.

As mentioned above, data lines in odd columns such as the first data line D4i−3, the third data line D4i−1, and the fifth data line D4i+1 apply the gray scale voltages of positive polarity to charge the first pixel unit 311 and the fourth pixel unit 314 in two sides of the first row as well as the sixth pixel unit 316 and the seventh pixel unit 317 in the middle of second row. Data lines in even columns such as the second data line D4i−2 and the fourth data line D4i apply the gray scale voltages of negative polarity to charge the second pixel unit 312 and the third pixel unit 313 in the middle of the first row as well as the fifth pixel unit 315 and the eighth pixel unit 318 in two sides of the second row. A driving method of other pixel unit sets are the same to the driving method of the pixel unit set 31. Therefore, the gray scale voltages of positive polarity of data lines in odd columns such as the first data line D4i−3, the third data line D4i−1, and the fifth data line D4i+1 are written into the first pixel unit 311 and the fourth pixel unit 314 in two sides of the first row of each pixel unit set 31, as well as written into the sixth pixel unit 316 and the seventh pixel unit 317 in the middle of the second row of each pixel unit set 31. The gray scale voltages of negative polarity of data lines in even columns such as the second data line D4i−2 and the fourth data line D4i are opposite to the gray scale voltages of positive polarity of data lines in odd columns, thereby realizing the LCD panel driven by the way of the 1+2 dot inversion as shown in FIG. 3.

In comparison with the prior art, the LCD panel of the present invention can realize the 1+2 dot inversion without continuously switching the polarities of the gray scale voltages of the data lines. Thus, the power consumption of the LCD panel of the present invention is greatly reduced.

Figure 6:
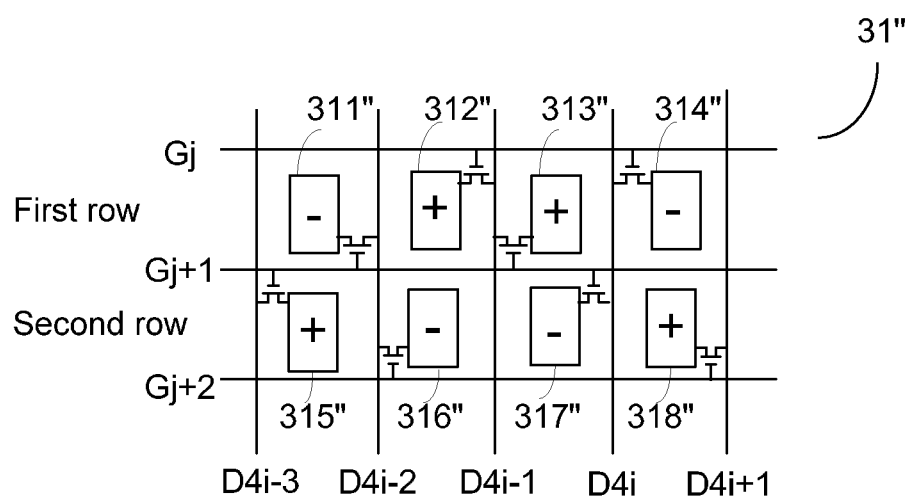
FIG. 6 is a schematic drawing illustrating a pixel unit set of an LCD panel according to a second preferred embodiment of the present invention.

Referring to FIG. 6, the pixel unit set of the LCD panel in the second embodiment are similar to the pixel unit set in the first embodiment of the present invention, the difference between them is that the coupling relation of the pixel units of the first row and the second row are exchanged each other. Specifically, the pixel unit set 31" includes a ninth pixel unit 311", a tenth pixel unit 312", a eleventh pixel unit 313", and a twelfth pixel unit 314" arranged in a first row as well as a thirteenth pixel unit 315", a fourteenth pixel unit 316", a fifteenth pixel unit 317", and an sixteenth pixel unit 318" arranged in a second row.

For the four pixel units in the first row, the ninth pixel unit 311" and the twelfth pixel unit 314" are respectively coupled to the second data line D4i−2 and the fourth data line D4i, and both the tenth pixel unit 312" and the eleventh pixel unit 313" are coupled to the third data line D4i−1. For the four pixel units in the second row, the thirteenth pixel unit 315" and the sixteenth pixel unit 318" are respectively coupled to the first data line D4i−3 and the fifth data line D4i+1, and the fourteenth pixel unit 316" and the fifteenth pixel unit 317" are respectively coupled to the second data line D4i−2 and the fourth data line D4i.

For the four pixel units in the first row, the gate electrodes of the thin film transistors of the ninth pixel unit 311" and the eleventh pixel unit 313" are coupled to the second scan line Gj+1, and the gate electrodes of the thin film transistors of the tenth pixel unit 312" and the twelfth pixel unit 314" are coupled to the first scan line Gj. For the four pixel units in the second row, the gate electrodes of the thin film transistors of the thirteenth pixel unit 315" and the fifteenth pixel unit 317" are coupled to the second scan line Gj+1, and the gate electrodes of the thin film transistors of the fourteenth pixel unit 316" and the sixteenth pixel unit 318" are coupled to the third scan line Gj+2.

The LCD panel of the present invention is not restricted to said embodiments. For example, the coupling relation between the gate electrodes of the thin film transistors of the pixel units and the scan lines can be changed, that is to say, the gate electrodes of the thin film transistors of the pixel units coupled to the same data line are coupled to different scan lines.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. An LCD panel, comprises: a plurality of data lines, a plurality of scan lines insulatingly intersecting the data lines, and a plurality of pixel units defined by the scan lines and corresponding data lines;

wherein five adjacent data lines sequentially arranged intersect three adjacent scan lines sequentially arranged to define eight pixel units designated as a pixel unit set, the five adjacent data lines comprise a first data line, a second data line, a third data line, a fourth data line, and a fifth data line and the three adjacent scan lines comprise a first scan line, a second scan line, and a third scan line, the pixel unit set comprise four adjacent pixel units composed of a first pixel unit, a second pixel unit, a third pixel unit, and a fourth pixel unit sequentially disposed in one row and other four adjacent pixel units composed of a fifth pixel unit, a sixth pixel unit, a seventh pixel unit, and an eighth pixel unit sequentially disposed in another adjacent other row;

wherein in four adjacent pixel units in one row, the first pixel unit and the fourth pixel unit are respectively coupled to the first data line and the fifth data line, and the second pixel unit and the third pixel unit are respectively coupled to the second data line and the fourth data line;

wherein in the other four adjacent pixel units in another adjacent row, the fifth pixel unit and the eighth pixel unit are respectively coupled to the second data line and the fourth data line, and both the sixth pixel unit and the seventh pixel unit are coupled to the third data line;

wherein the pixel units coupled to a same data line are respectively coupled to different scan lines.

2. The LCD panel according to claim 1, wherein the first pixel unit and the third pixel unit are coupled to the first scan line, and the second pixel unit, the fourth pixel unit, the sixth pixel unit, and the eighth pixel unit are all coupled to the second scan line, and both the fifth pixel unit and the seventh pixel unit are coupled to the third scan line.

3. The LCD panel according to claim 1, wherein each pixel unit comprises a thin film transistor, the thin film transistor includes a source electrode and a gate electrode; the source electrodes of the thin film transistors of the first pixel unit and the fourth pixel unit are respectively coupled to the first data line and the fifth data line, the source electrodes of the thin film transistors of the second pixel unit and the third pixel unit are respectively coupled to the second data line and the fourth data line; the source electrodes of the thin film transistors of the fifth pixel unit and the eighth pixel unit are respectively coupled to the second data line and the fourth data line, and both the source electrodes of the thin film transistors of the sixth pixel unit and the seventh pixel unit are coupled to the third data line.

4. An LCD panel, comprises: a plurality of data lines, a plurality of scan lines insulatingly intersecting the data lines, and a plurality of pixel units defined by the scan lines and corresponding data lines;

wherein five adjacent data lines sequentially arranged intersect three adjacent scan lines sequentially arranged to define eight pixel units designated as a pixel unit set, the five adjacent data lines comprise a first data line, a second data line, a third data line, a fourth data line, and a fifth data line and the three adjacent scan lines comprise a first scan line, a second scan line, and a third scan line, the pixel unit set comprise four adjacent pixel units composed of a ninth pixel unit, a tenth pixel unit, an eleventh pixel unit, and a twelfth pixel unit sequentially disposed in one row and other four adjacent pixel units composed of a thirteenth pixel unit, a fourteenth pixel unit, a fifteenth pixel unit, and a sixteenth pixel sequentially disposed in another adjacent row;

wherein in the four adjacent pixel units in one row, the ninth pixel unit and the twelfth pixel unit are respectively coupled to the second data line and the fourth data line, and both the tenth pixel unit and the eleventh pixel unit are coupled to the third data line;

wherein in the other four adjacent pixel units in another adjacent row, the thirteenth pixel unit and the sixteenth pixel unit are respectively coupled to the first data line and the fifth data line, and the fourteenth pixel unit and the fifteenth pixel unit are respectively coupled to the second data line and the fourth data line;

wherein the pixel units coupled to a same data line are respectively coupled to different scan lines.

5. The LCD panel according to claim 4, wherein in the four adjacent pixel units in one row, both the ninth pixel unit and the eleventh pixel unit are coupled to the second scan line, and both the tenth pixel unit and the twelfth pixel unit are coupled to the first scan line; in the other four adjacent pixel units in another adjacent row, both the thirteenth pixel unit and the fifteenth pixel unit are coupled to the second scan line, and both the fourteenth pixel unit and the sixteenth pixel unit are coupled to the third scan line.

6. The LCD panel according to claim 4, wherein each pixel unit comprises a thin film transistor, the thin film transistor includes a source electrode and a gate electrode; the source electrodes of the thin film transistors of the ninth pixel unit and the twelfth pixel unit are respectively coupled to the second data line and the fourth data line, the source electrodes of the thin film transistors of both the tenth pixel unit and the eleventh pixel unit are coupled to the third data line; the source electrodes of the thin film transistors of the thirteenth pixel unit and the sixteenth pixel unit are respectively coupled to the first data line and the fifth data line, and the source electrodes of the thin film transistors of the fourteenth pixel unit and the fifteenth pixel unit are respectively coupled to the second data line and the fourth data line.

7. An LCD panel, comprises: a plurality of data lines, a plurality of scan lines insulatingly intersecting the data lines, and a plurality of pixel units defined by the scan lines and corresponding data lines; wherein any two adjacent pixel units in a same row are respectively coupled to two corresponding scan lines, any two adjacent pixel units in a same column are respectively coupled to two corresponding data lines;

wherein five adjacent data lines sequentially arranged intersect three adjacent scan lines sequentially arranged to define eight pixel units designated as a pixel unit set, the five adjacent data lines comprise a first data line, a second data line, a third data line, a fourth data line, and a fifth data line and the three adjacent scan lines comprise a first scan line, a second scan line, and a third scan line, the pixel unit set comprise four adjacent pixel units composed of a first pixel unit, a second pixel unit, a third pixel unit, and a fourth pixel unit sequentially disposed in one row and other four adjacent pixel units composed of a fifth pixel unit, a sixth pixel unit, a seventh pixel unit, and an eighth pixel unit sequentially disposed in another adjacent other row; wherein in four adjacent pixel units in one row, the first pixel unit and the fourth pixel unit are respectively coupled to the first data line and the fifth data line, and the second pixel unit and the third pixel unit are respectively coupled to the second data line and the fourth data line; wherein in the other four adjacent pixel units in another adjacent row, the fifth pixel unit and the eighth pixel unit are respectively coupled to the second data line and the fourth data line, and both the sixth pixel unit and the seventh pixel unit are coupled to the third data line.

8. The LCD panel according to claim 7, wherein the first pixel unit and the third pixel unit are coupled to the first scan line, and the second pixel unit, the fourth pixel unit, the sixth pixel unit, and the eighth pixel unit are all coupled to the second scan line, and both the fifth pixel unit and the seventh pixel unit are coupled to the third scan line.

9. The LCD panel according to claim 8, wherein each pixel unit comprises a thin film transistor, the thin film transistor includes a source electrode and a gate electrode; the source electrodes of the thin film transistors of the first pixel unit and the fourth pixel unit are respectively coupled to the first data line and the fifth data line, the source electrodes of the thin film transistors of the second pixel unit and the third pixel unit are respectively coupled to the second data line and the fourth data line; the source electrodes of the thin film transistors of the fifth pixel unit and the eighth pixel unit are respectively coupled to the second data line and the fourth data line, and both the source electrodes of the thin film transistors of the sixth pixel unit and the seventh pixel unit are coupled to the third data line.

10. The LCD panel according to claim 7, wherein five adjacent data lines sequentially arranged intersect three adjacent scan lines sequentially arranged to define eight pixel units designated as a pixel unit set, the five adjacent data lines comprise a first data line, a second data line, a third data line, a fourth data line, and a fifth data line and the three adjacent scan lines comprise a first scan line, a second scan line, and a third scan line, the pixel unit set comprise four adjacent pixel units composed of a ninth pixel unit, a tenth pixel unit, an eleventh pixel unit, and a twelfth pixel unit sequentially disposed in one row and other four adjacent pixel units composed of a thirteenth pixel unit, a fourteenth pixel unit, a fifteenth pixel unit, and a sixteenth pixel sequentially disposed in another adjacent row; wherein in the four adjacent pixel units in one row, the ninth pixel unit and the twelfth pixel unit are respectively coupled to the second data line and the fourth data line, and both the tenth pixel unit and the eleventh pixel unit are coupled to the third data line; wherein in the other four adjacent pixel units in another adjacent row, the thirteenth pixel unit and the sixteenth pixel unit are respectively coupled to the first data line and the fifth data line, and the fourteenth pixel unit and the fifteenth pixel unit are respectively coupled to the second data line and the fourth data line.

11. The LCD panel according to claim 10, wherein in four adjacent pixel units in one row, both the ninth pixel unit and the eleventh pixel unit are coupled to the second scan line, and both the tenth pixel unit and the twelfth pixel unit are coupled to the first scan line; wherein in the other four adjacent pixel units in another adjacent row, both the thirteenth pixel unit and the fifteenth pixel unit are coupled to the second scan line, and both the fourteenth pixel unit and the sixteenth pixel unit are coupled to the third scan line.

12. The LCD panel according to claim 11, wherein each pixel unit comprises a thin film transistor, the thin film transistor includes a source electrode and a gate electrode; the source electrodes of the thin film transistors of the ninth pixel unit and the twelfth pixel unit are respectively coupled to the second data line and the fourth data line, the source electrodes of the thin film transistors of both the tenth pixel unit and the eleventh pixel unit are coupled to the third data line; the source electrodes of the thin film transistors of the thirteenth pixel unit and the sixteenth pixel unit are respectively coupled to the first data line and the fifth data line, and the source electrodes of the thin film transistors of the fourteenth pixel unit and the fifteenth pixel unit are respectively coupled to the second data line and the fourth data line.

\* \* \* \* \*